US009706453B2

United States Patent
Pani et al.

(10) Patent No.: US 9,706,453 B2
(45) Date of Patent: *Jul. 11, 2017

(54) WIRELESS COMMUNICATION METHOD AND APPARATUS FOR SUPPORTING RECONFIGURATION OF RADIO LINK CONTROL PARAMETERS

(71) Applicant: InterDigital Technology Corporation, Wilmington, DE (US)

(72) Inventors: Diana Pani, Montreal (CA); Christopher R Cave, Dollard-des-Ormeaux (CA); Stephen E Terry, Northport, NY (US); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,400

(22) Filed: Sep. 16, 2015

(65) Prior Publication Data

US 2016/0007250 A1 Jan. 7, 2016

Related U.S. Application Data

(63) Continuation of application No. 14/196,797, filed on Mar. 4, 2014, now Pat. No. 9,167,489, which is a (Continued)

(51) Int. Cl.
*H04W 36/34* (2009.01)
*H04W 36/00* (2009.01)
(Continued)

(52) U.S. Cl.
CPC ....... *H04W 36/0072* (2013.01); *H04L 1/1877* (2013.01); *H04L 12/5695* (2013.01);
(Continued)

(58) Field of Classification Search
None
See application file for complete search history.

(56) References Cited

U.S. PATENT DOCUMENTS 6,717,927 B2  4/2004  Chao et al.
6,901,063 B2  5/2005  Vayanos et al.
(Continued)

FOREIGN PATENT DOCUMENTS

EP  1487161  12/2004
JP  2005-006320 A  1/2005
(Continued)

OTHER PUBLICATIONS

"3rd Generation Partnership Project, Technical Specification Group Radio Access Network; Radio Resource Control Protocol Specification (Release 7)", 3GPP TS 25.331 V7.3.0, Dec. 2006, 1316 pages.
(Continued)

*Primary Examiner* — Chi H Pham
*Assistant Examiner* — Shick Hom
(74) *Attorney, Agent, or Firm* — Julian F. Santos

(57) ABSTRACT

A variety of wireless communication methods and apparatus for supporting reconfiguration of radio link control (RLC) parameters are disclosed. A radio resource control (RRC) reconfiguration message is generated that indicates that an RLC unit in a wireless transmit/receive unit (WTRU) or a universal terrestrial radio access network (UTRAN) should be reconfigured from supporting flexible size RLC protocol data units (PDUs) to supporting fixed size RLC PDUs. If an information element (IE) "one sided RLC re-establishment" is present in the RRC reconfiguration message, only a receiving side subassembly in the RLC unit is re-established. Otherwise, both the receiving side subassembly and a transmitting side subassembly in the RLC unit are re-
(Continued)

established. Flexible size RLC PDUs may be discarded and a message indicating the discarded flexible size RLC PDUs may be transmitted. The flexible size RLC PDUs may be modified such that they correspond to a set of pre-defined sizes.

36 Claims, 1 Drawing Sheet

Related U.S. Application Data continuation of application No. 13/397,513, filed on Feb. 15, 2012, now Pat. No. 8,705,406, which is a continuation of application No. 12/047,409, filed on Mar. 13, 2008, now Pat. No. 8,130,706.

(60) Provisional application No. 60/895,338, filed on Mar. 16, 2007, provisional application No. 60/908,076, filed on Mar. 26, 2007, provisional application No. 60/914,189, filed on Apr. 26, 2007.

(51) Int. Cl.
  *H04L 1/18* (2006.01)
  *H04L 12/54* (2013.01)
  *H04L 12/805* (2013.01)
  *H04W 76/02* (2009.01)
  *H04W 72/12* (2009.01)

(52) U.S. Cl.
  CPC ....... *H04L 47/365* (2013.01); *H04W 36/0055* (2013.01); *H04W 76/028* (2013.01); *H04W 72/12* (2013.01)

(56) References Cited

U.S. PATENT DOCUMENTS

| | | | |
|---|---|---|---|
| 6,987,981 B2 | 1/2006 | Kuo | |
| 7,046,648 B2 | 5/2006 | Zhang et al. | |
| 7,123,603 B2 | 10/2006 | Houzel | |
| 7,283,508 B2 | 10/2007 | Choi et al. | |
| 7,286,563 B2 | 10/2007 | Chang et al. | |
| 7,447,504 B2 | 11/2008 | Lohr | |
| 7,447,968 B2 | 11/2008 | Ha et al. | |
| 7,522,560 B2 | 4/2009 | Soderstrom et al. | |
| 7,525,944 B2 | 4/2009 | Vayanos et al. | |
| 7,639,659 B2 | 12/2009 | Ha et al. | |
| 7,657,815 B2 | 2/2010 | Seidel et al. | |
| 7,701,922 B2 | 4/2010 | Terry | |
| 7,839,852 B2 | 11/2010 | Liu et al. | |
| 8,130,706 B2 * | 3/2012 | Pani | H04L 1/1877 370/329 |
| 8,130,720 B2 | 3/2012 | Zhang et al. | |
| 8,285,330 B2 | 10/2012 | Lee et al. | |
| 8,325,656 B2 | 12/2012 | Lindskog et al. | |
| 8,351,400 B2 | 1/2013 | Damnjanovic et al. | |
| 8,705,406 B2 * | 4/2014 | Pani | H04L 1/1877 370/254 |
| 9,167,489 B2 * | 10/2015 | Terry | H04L 1/1877 |
| 2003/0016698 A1 | 1/2003 | Chang et al. | |
| 2003/0147370 A1 | 8/2003 | Wu | |
| 2003/0147371 A1 | 8/2003 | Farrell et al. | |
| 2003/0152084 A1 * | 8/2003 | Lee | G06F 9/3885 370/395.21 |
| 2003/0189909 A1 | 10/2003 | Chao et al. | |
| 2003/0206534 A1 | 11/2003 | Wu | |
| 2003/0210676 A1 | 11/2003 | Wu | |
| 2004/0052229 A1 | 3/2004 | Terry et al. | |
| 2004/0184437 A1 | 9/2004 | Lee et al. | |
| 2004/0228313 A1 | 11/2004 | Cheng et al. | |
| 2004/0252719 A1 | 12/2004 | Jami et al. | |
| 2005/0009527 A1 | 1/2005 | Sharma | |
| 2005/0096054 A1 | 5/2005 | Zhang et al. | |
| 2005/0147040 A1 | 7/2005 | Vayanos et al. | |
| 2005/0169205 A1 | 8/2005 | Grilli et al. | |
| 2005/0193309 A1 | 9/2005 | Grilli et al. | |
| 2005/0249140 A1 | 11/2005 | Lee et al. | |
| 2006/0092972 A1 | 5/2006 | Petrovic et al. | |
| 2006/0092973 A1 | 5/2006 | Petrovic et al. | |
| 2006/0281413 A1 | 12/2006 | Burbidge | |
| 2006/0293055 A1 | 12/2006 | Pirskanan | |
| 2007/0047452 A1 | 3/2007 | Lohr et al. | |
| 2007/0155335 A1 | 7/2007 | Love et al. | |
| 2007/0224990 A1 * | 9/2007 | Edge | H04W 8/24 455/436 |
| 2007/0280207 A1 | 12/2007 | Shimizu et al. | |
| 2008/0064390 A1 | 3/2008 | Kim | |
| 2008/0101411 A1 | 5/2008 | Takahashi et al. | |
| 2008/0198763 A1 | 8/2008 | Fischer et al. | |
| 2008/0254800 A1 | 10/2008 | Chun et al. | |
| 2008/0285538 A1 | 11/2008 | Wu | |
| 2008/0310338 A1 | 12/2008 | Charpenter et al. | |
| 2009/0036061 A1 | 2/2009 | Chun et al. | |
| 2009/0185535 A1 | 7/2009 | Lee et al. | |
| 2009/0296668 A1 | 12/2009 | Capone | |
| 2010/0061324 A1 | 3/2010 | Liao et al. | |

FOREIGN PATENT DOCUMENTS

| | | |
|---|---|---|
| JP | 2005-539468 A | 12/2005 |
| JP | 2006-166479 A | 6/2006 |
| KR | 10-2004-0068057 | 7/2004 |
| KR | 10-2004-0111002 | 12/2004 |
| RU | 2263415 | 11/2003 |
| RU | 2 287 220 | 11/2006 |
| WO | WO-01/30103 | 4/2001 |
| WO | WO-03/058852 A1 | 7/2003 |
| WO | WO-03/096617 | 11/2003 |
| WO | WO-2004/025842 | 3/2004 |
| WO | WO-2004/091130 | 10/2004 |
| WO | WO-2005/018241 | 2/2005 |
| WO | WO-2005/122441 A1 | 12/2005 |
| WO | WO-2006/134480 A2 | 12/2006 |
| WO | WO-2006/135482 | 12/2006 |
| WO | WO-2007/130325 A2 | 11/2007 |
| WO | WO-2008/070682 A2 | 6/2008 |
| WO | WO-2008/075185 A2 | 6/2008 |
| WO | WO-2008/097486 A2 | 8/2008 |
| WO | WO-2008/115392 A2 | 9/2008 |

OTHER PUBLICATIONS

"3rd Generation Partnership Project: Technical Specification Group Radio Access Network; Medium Access Control (MAC) Protocol Specification (Release 7)", 3GPP TS 25.321 V7.3.0; Release 715T, Dec. 2006, 113 pages.

"3rd Generation Partnership Project; Technical Specification Group Radio Access Network; High Speed Downlink Packet Access (HSDPA) Overall Description; Stage 2 (Release 7)", 3GPP TS 25.308 V7.5.0, Dec. 2007, 50 pages.

"3rd Generation Partnership Project; Technical Specification Group Radio Access Network; High Speed Downlink Packet Access (HSDPA) Overall Description; Stage 2 (Release 8)", 3GPP TS 25.308 V8.0.0, Dec. 2007, 50 pages.

"3rd Generation Partnership Project; Technical Specification Group Radio Access Network; High Speed Downlink Packet Access (HSDPA); Overall Description; Stage 2 (Release 7)", 3GPP TS 25.308 V7.1.0, Dec. 2006, 34 pages.

"3rd Generation Partnership Project; Technical Specification Group Radio Access Network; High Speed Packet Access (HSPA) Evolution; Frequency Division Duplex (FDD) (Release 7)", 3GPP TR 25.999 V1.0.0, Nov. 2006, 43 pages.

"3rd Generation Partnership Project; Technical Specification Group Radio Access Network; High Speed Packet Access (HSPA) Evolution; Frequency Division Duplex (FDD) (Release 7)", 3GPP TR 25.999 V7.0.1, Dec. 2007, 58 pages.

"3rd Generation Partnership Project; Technical Specification Group Radio Access Network; Medium Access Control (MAC) Protocol Specification (Release 7)", 3GPP TS 25.321 V7.3.0, Dec. 2006, 113 pages.

(56) References Cited

OTHER PUBLICATIONS

"3rd Generation Partnership Project; Technical Specification Group Radio Access Network; Medium Access Control (MAC) Protocol Specification (Release 7)", 3GPP TS 25.321 V7.4.0, Mar. 2007, 126 pages.
"3rd Generation Partnership Project; Technical Specification Group Radio Access Network; Medium Access Control (MAC) Protocol Specification (Release 7)", 3GPP TS 25.321 V7.5.0, Jun. 2007, 141 pages.
"3rd Generation Partnership Project; Technical Specification Group Radio Access Network; Medium Access Control (MAC) Protocol Specification (Release 7)", 3GPP TS 25.321 V7.7.0, Dec. 2007, 146 pages.
"3rd Generation Partnership Project; Technical Specification Group Radio Access Network; Medium Access Control (MAC) Protocol Specification (Release 8)", 3GPP TS 25.321 V8.0.0, Dec. 2007, 146 pages.
"3rd Generation Partnership Project; Technical Specification Group Radio Access Network; Radio Link Control (RLC) Protocol Specification (Release 7)", 3GPP TS 25.322 V7.2.0, Sep. 2006, 86 pages.
"3rd Generation Partnership Project; Technical Specification Group Radio Access Network; Radio Link Control (RLC) Protocol Specification (Release 7)", 3GPP TS 25.322 V7.5.0, Dec. 2007 88 pages.
"3rd Generation Partnership Project; Technical Specification Group Radio Access Network; Radio Link Control (RLC) Protocol Specification (Release 8)", 3GPP TS 25.322 V8.0.0, Dec. 2007, 89 pages.
"3rd Generation Partnership Project; Technical Specification Group Radio Access Network; Radio Resource Control (RRC) Protocol Specification (Release 7)", 3GPP TS 25.331 V7.3.0, Dec. 2006, 1316 pages.
"3rd Generation Partnership Project; Technical Specification Group Radio Access Network; Radio Resource Control (RRC) Protocol Specification (Release 7)", 3GPP TS 25.331 V7.5.0, Jun. 2007, 1429 pages.
"3rd Generation Partnership Project; Technical Specification Group Radio Access Network; Radio Resource Control (RRC) Protocol Specification (Release 7)", 3GPP TS 25.331 V7.7.0, Dec. 2007, 1469 pages.
"3rd Generation Partnership Project; Technical Specification Group Radio Access Network; Radio Resource Control (RRC) Protocol Specification (Release 8)", 3GPP TS 25.331 V8.1.0, Dec. 2007, 1471 pages.
"Decision on Grant for Patent for Invention", Russian Patent Application No. 2009132930/07(046207), Oct. 28, 2011, 5 pages.
"Decision on Grant for Patent for Invention (Partial Translation)", Russian Patent Application No. 2009132930/07(046207), Oct. 28, 2011, 3 pages.
"International Search Report and Written Opinion", International Patent Application No. PCT/US2008/001398, Aug. 14, 2009, 30 pages.
"Japanese Notice of Allowance", Japanese Application No. 2014-113199, Jan. 20, 2015, 3 pages.
"Japanese Notice of Allowance (English Translation)", Japanese Application No. 2014-113199, Jan. 20, 2015, 3 pages.
"Japanese Official Notice of Rejection", Japanese Application No. 2012-000238, Jan. 14, 2014, 2 pages.
"Japanese Official Notice of Rejection (English Translation)", Japanese Application No. 2012-000238, Jan. 14, 2014, 2 pages.
"Japanese Official Notice of Rejection", Japanese Patent Application No. 2012-000238, Feb. 5, 2013, 2 pages.
"Japanese Official Notice of Rejection (English translation)", Japanese Patent Application No. 2012-000238, Feb. 5, 2013, 2 pages.
"Korean Office Action", Korean Patent Application No. 10-2012-7012558, Apr. 5, 2013, 4 pages.
"Korean Office Action (English Translation)", Korean Patent Application No. 10-2012-7012558, Apr. 5, 2013, 4 pages.
"Notification of Transmittal of International Preliminary Report on Patentability", PCT/US2008/001398, Aug. 14, 2009, 17 pages.
"Notification of Transmittal of International Report on Patentability", International Patent Application No. PCT/US2008/003336, Jun. 24, 2009, 18 pages.
"Notification of Transmittal of the International Search Report and Written Opinion", International Patent Application No. PCT/US2008/003336, Oct. 10, 2008, 18 pages.
"Official Decision of Grant", Russian Application No. 2009138222, Nov. 2, 2011, 9 pages.
"Official Decision of Grant (English translation)", Russian Application No. 2009138222, Nov. 2, 2011, 6 pages.
"Russian Office Action", Russian Patent Application No. 2009138222/09(054100), National Stage Application of PCT/US2008/003336, Mar. 17, 2011, 4 pages.
"Russian Office Action (Partial Translation)", Russian Patent Application No. 2009138222/09(054100), National Stage Application of PCT/US2008/003336, Mar. 17, 2011, 2 pages.
"Search Report and Written Opinion", Singapore Patent Application No. 200906119-3, National Stage of PCT Application No. PCT/US2008/003336, Sep. 29, 2010, 10 pages.
"Search Report and Written Opinion", Singapore Patent Application No. 200905104-6, Nov. 30, 2010, 12 pages.
"Taiwanese Office action", Taiwanese Application No. 097109226, Sep. 9, 2013, 7 Pages.
"Taiwanese Office Action (English Translation)", Taiwanese Application No. 097109226, Sep. 9, 2013, 4 Pages.
Ericsson, "Introducing flexible RLC PDU size in the uplink", 3GPP Tdoc R2-080788, Change Request TS 25.322 V8.0.0, 3GPP TSG-RAN2 Meeting #61, Sorrento, Italy, Feb. 11-15, 2008, 16 pages.
Ericsson, "Introduction of Improved L2 support for high data rates", 3GPP Tdoc R2-072307, Change Request TS 25.331, V7.4.0, 3GPP TSG-TAN WG2 Meeting #58, Kobe, Japan, May 7-11, 2007, 130 pages.
Ericsson, et al., "Introduction of Improved L2 support for high data rates and Enhanced CELL__FACH state", 3GPP Tdoc R2-072258, Change Request TS 25.321 V7.4.0, 3GPP TSG-RAN WG2 Meeting #58, Kobe, Japan, May 7-11, 2007, 39 pages.
Ericsson, "L2 Enhancements: Draft CR to RLC", 3GPP Tdoc R2-071198, Change Request TS 25.331, V7.3.0, 3GPP TSG-RAN WG2 Meeting #57bis, St. Julian's, Malta, Mar. 26-30, 2007, 17 pages.
Ericsson, "L2 Enhancements: Draft CR to RLC", 3GPP Tdoc R2-070034, Change Request TS 25.322 V7.2.0, 3GPP TSG-RAN2 Meeting #56bis, Sorento, Italy, Jan. 15-19, 2007, 56 pages.
Ericsson, "L2 Enhancements: Stage 2", 3GPP Tdoc R2-071077, Change Request TS 25.308 V7.1.0, 3GPP TSG-RAN2 Meeting #57, St. Louis, USA, Feb. 12-16, 2007, 21 pages.
Ericsson, "Proposed CR to TS 25.331 [Rel-7] on Introducing Enhanced L2 in RRC specification", 3GPP Tdoc R2-071063, Change Request 25.331 V7.3.0, 3GPP TSG-RAN2 Meeting #57, St. Louis, USA, Feb. 12-16, 2007, 8 pages.
ETSI, "Universal Mobile Telecommunications System (UMTS); Medium Access Control (MAC) Protocol Specification", 3GPP TS 25.321, V7.3.0, Release 7, vol. 3-R2, ETSI Standards, LIS, Sophia Antipolis Cedex, France, Dec. 2006, 113 pages.
ETSI, "Universal Mobile Telecommunications System (UMTS); Medium Access Control (MAC) Protocol Specification", 3GPP TS 25.321, V7.7.0, Release 7, vol. 3-R2, ETSI Standards, LIS, Sophia Antipolis Cedex, France, Jan. 2008, 151 pages.
ETSI, "Universal Mobile Telecommunications System (UMTS); Multiplexing and Channel Coding (FDD)", 3GPP TS 25.212 7.3.0, Release 7, Dec. 2006, 86 pages.
Interdigital, "Mobility and Interworking Between R6 and R7", 3GPP Tdoc R2-071186, 3GPP TSG-RAN WG2 Meeting #57bis, St. Julian's, Malta, Mar. 26-30, 2007, 3 pages.
Mazor, et al., "Dodeka-XXI", Radiotechnica, edition, Moscow, Publishing House, 2002, 2 Pages.
Nokia, "Summary of RAN2-56 Input to the HSPA+ TR", 3GPP Tdoc R2-063612, 3GPP TSG-RAN WG2 Meeting #56, Riga, Latvia, Nov. 6-10, 2006, 3 pages.
Polovinkina, et al., "Inform-systema", Technical art: theory, methodology, practice, edition, Moscow, NPO, 1995, 2 pages.

(56) References Cited

OTHER PUBLICATIONS

Siemens, "HSDPA Signalling Requirements for TDD Mode", 3GPP Tdoc R2-010715, 3GPP TSG-RAN Working Group2 meeting 19, Sophia Antipolis, Feb. 19/23, 2001, 7 pages.
U.S. Appl. No. 12/024,539, filed Feb. 1, 2008.
U.S. Appl. No. 13/216,564, filed Mar. 1, 2012.
U.S. Appl. No. 14/188,244, filed Feb. 24, 2014.
"Examination Notification", Taiwanese Patent Application No. 103113497, Oct. 28, 2015, 3 pages.
"Examination Notification (English Translation)", Taiwanese Patent Application No. 103113497, Oct. 28, 2015, 4 pages.
"Examination Notification", Taiwanese Patent Application No. 103136069, Oct. 24, 2016, 15 pages.
"Examination Notification (English Translation)", Taiwanese Patent Application No. 103136069, Oct. 24, 2016, 11 pages.
"Official Notice of Rejection", Japanese Patent Application No. 2016-010093, Sep. 13, 2016, 3 pages.
"Official Notice of Rejection (English Translation)", Japanese Patent Application No. 2016-010093, Sep. 13, 2016, 4 Pages.
Ericsson, "L2 Enhancements: CR to RLC", 3GPP Tdoc R2-071062, 3GPP TSG-RAN2 Meeting #57, Change Request to 25.322 CR draft, St. Louis, USA, Feb. 12-16, 2007, 54 pages.

\* cited by examiner

US 9,706,453 B2

WIRELESS COMMUNICATION METHOD AND APPARATUS FOR SUPPORTING RECONFIGURATION OF RADIO LINK CONTROL PARAMETERS

CROSS REFERENCE TO RELATED APPLICATIONS

This application is a continuation of U.S. Non-Provisional application Ser. No. 14/196,797, filed Mar. 4, 2014, now U.S. Pat. No. 9,167,489, which is a continuation of U.S. Non-Provisional application Ser. No. 13/397,513, filed Feb. 15, 2012, now U.S. Pat. No. 8,705,406, which is a continuation of U.S. Non-Provisional application Ser. No. 12/047,409, filed Mar. 13, 2008, now U.S. Pat. No. 8,130,706, which claims the benefit of U.S. Provisional Application Ser. No. 60/895,338 filed Mar. 16, 2007, U.S. Provisional Application Ser. No. 60/908,076 filed Mar. 26, 2007, and U.S. Provisional Application Ser. No. 60/914,189 filed Apr. 26, 2007. Each of the U.S. Non-provisional application Ser. Nos. 12/047,409, 13/397,513 and 14/196,797, and each of the U.S. Provisional Application Ser. Nos. 60/895,338, 60/908,076 and 60/914,189 is incorporated by reference as if fully set forth herein.

FIELD OF INVENTION

This application is related to wireless communications.

BACKGROUND

Some of the major goals of high speed packet access (HSPA) evolution include higher data rates, higher system capacity and coverage, enhanced support for packet services, reduced latency, reduced operator costs and backward compatibility. Meeting these goals requires evolutions to the radio interface protocol and network architecture. More specifically, meeting these goals has required a set of enhancements and architecture changes to layer 2 (L2), (i.e., radio link control (RLC) and medium access control (MAC)), functionalities.

Some of the L2 enhancements include flexible size RLC protocol data units (PDUs), (i.e., RLC PDUs having flexible sizes), high speed MAC (MAC-hs) segmentation/concatenation and multiplexing. In universal terrestrial radio access (UTRA) Release 6 (R6), the acknowledge mode (AM) RLC entities can only use fixed size RLC PDUs, (i.e., RLC PDUs having a fixed size). In addition, the MAC-hs sub-layer in the Node-B can only support concatenation of dedicated MAC (MAC-d) PDUs. The L2 enhancements of UTRA Release 7 (R7) result in significant RLC/MAC changes of R6 features.

Currently, when radio bearers (RBs) are setup or reconfigured via radio resource control (RRC) signaling, the information element (IE) "RB mapping info" is present. The "RB mapping info" contains information about the RLC instance and transport channels corresponding to the RB.

The MAC-hs configuration has to be the same across all RBs mapped to a high speed-downlink shared channel (HS-DSCH), or else an invalid configuration will result.

In HSPA, the high speed shared channels are monitored by a wireless transmit/receive unit (WTRU) in a single cell, (i.e., the serving HS-DSCH cell). Due to mobility, when the WTRU is moving from one cell to the other, the WTRU needs to perform a serving cell change by switching to a new serving HS-DSCH cell and terminating communication with the old serving HS-DSCH cell. In a Node-B relocation procedure, an inter-Node-B handover occurs from an old Node-B, (i.e., a source Node-B) to a new Node-B, (i.e., a target Node-B).

At the time of a serving Node-B change, the target Node-B needs to start transmission of data over the new configuration. The handover can occur among evolved HSPA Node-Bs which support the L2 enhancements, or to/from cells with or without L2 enhancements. For both cases, the WTRU must be able to perform a handover, adjust to the new configurations, and minimize data loss.

With the introduction of new L2 enhancements, new procedures need to be defined in order to optimize and minimize data loss during a handover between R7 cells, or between an R7 cell and an R6 cell. Specifically, procedures that deal with resetting of the MAC-hs entity need to be modified in order to account for the new L2 enhancements.

In addition, it cannot be assumed that all of the R6 Node-Bs will be upgraded at the same time to R7 Node-Bs. Therefore, handovers between R6 and R7 cells may frequently occur. Due to the functional changes of the RLC and MAC, methods to perform handovers with minimal loss of quality and data between these cells must be defined. Specifically, on the WTRU side, the MAC-hs and the RLC must perform functional changes during the handovers.

SUMMARY

A variety of wireless communication methods and apparatus for supporting reconfiguration of RLC parameters are disclosed. An RRC reconfiguration message is generated that indicates that an RLC unit in a WTRU or a universal terrestrial radio access network (UTRAN) should be reconfigured from supporting flexible size RLC PDUs to supporting fixed size RLC PDUs or vice versa. If an IE "one sided RLC re-establishment" is present in the RRC reconfiguration message, only a receiving side or a transmitting side subassembly in the RLC unit is re-established. Otherwise, both the receiving side subassembly and a transmitting side subassembly in the RLC unit are re-established. Flexible size RLC PDUs may be discarded and a message indicating the discarded flexible size RLC PDUs may be transmitted. The flexible size RLC PDUs may be modified such that they correspond to a set of pre-defined sizes.

BRIEF DESCRIPTION OF THE DRAWINGS

A more detailed understanding of the invention may be had from the following description in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station"

includes but is not limited to a Node-B, a site controller, an access point (AP), or any other type of interfacing device capable of operating in a wireless environment.

A variety of wireless communication methods are disclosed herein that optimize handover scenarios, reset procedures, reconfiguration procedures for an RLC entity. Furthermore, a variety of wireless communication methods for handovers between cells in which one or both of the cells support L2 enhancements are disclosed. Both the uplink (UL) and downlink (DL) are applicable to these wireless communication methods.

The following terms are used throughout the following description and are briefly defined. An enhanced MAC-hs (MAC-ehs) payload unit is a MAC-ehs service data unit (SDU), or a segment of a MAC-ehs SDU contained in a MAC-ehs PDU. A MAC-ehs reordering PDU is a set of MAC-ehs payload units in a MAC-ehs PDU that belongs to the same priority queue. An enhanced cell is a cell that supports L2 enhancements, i.e., flexible size RLC PDUs. A non-enhanced cell is a cell that does not support L2 enhancements, i.e., fixed size RLC PDUs.

When referred to hereafter, R6 includes but is not limited to a cell, a Node-B, or a radio network controller (RNC) that does not support flexible size RLC PDUs, (i.e., fixed size RLC PDUs are supported). When referred to hereafter, R7 includes but is not limited to a cell, a Node-B or an RNC that supports flexible size RLC PDUs.

When referred to hereafter, UTRAN includes but is not limited to a cell, a Node B, an RNC, or a network node.

Figure 1:
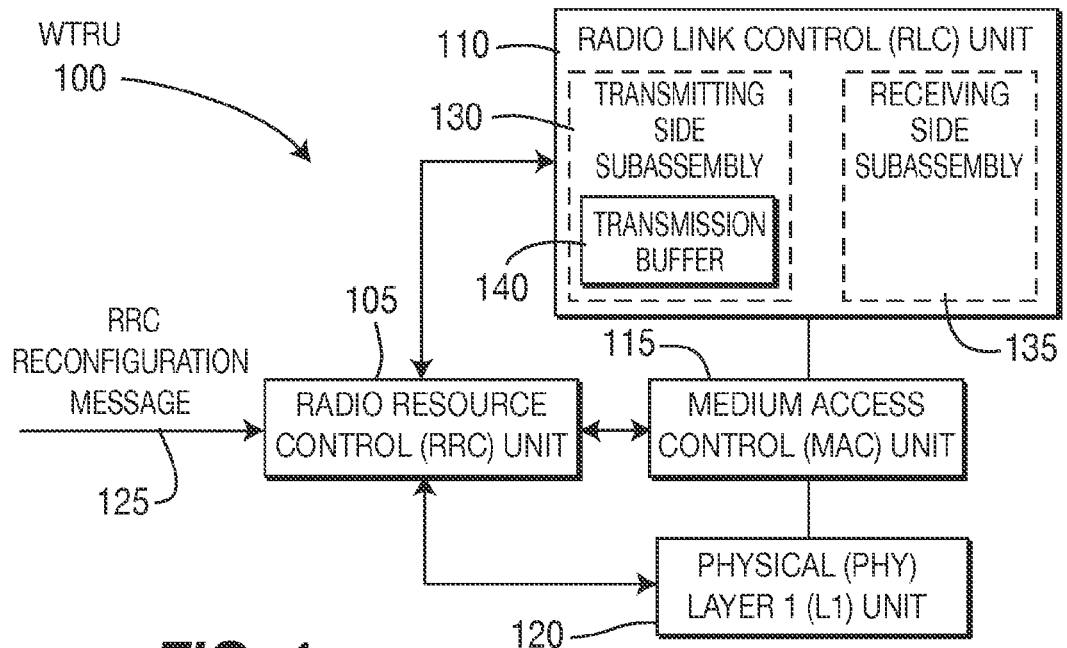
FIG. 1 is an exemplary block diagram of a WTRU that moves between R6 and R7 cells, and is configured to operate with the new RLC and MAC-hs sub-layers when a handover message is received during a serving cell change procedure.

FIG. 1 is an exemplary block diagram of a WTRU 100 that moves between non-enhanced cells and enhanced cells, and is configured to operate with the new RLC and MAC-ehs sub-layers when a handover message is received during a serving cell change procedure. As shown in FIG. 1, the WTRU 100 includes an RRC unit 105, an RLC unit 110, a MAC unit 115 and a physical (PHY) layer 1 (L1) unit 120. The initiation of a serving cell change may occur in response to the receipt of an RRC reconfiguration message 125, such as an RB RRC reconfiguration message, a transport channel RRC reconfiguration message or a physical channel RRC reconfiguration message. The RLC unit 110 includes a transmitting side subassembly 130 and a receiving side subassembly 135. The transmitting side subassembly 130 includes a transmission buffer 140.

Figure 2:
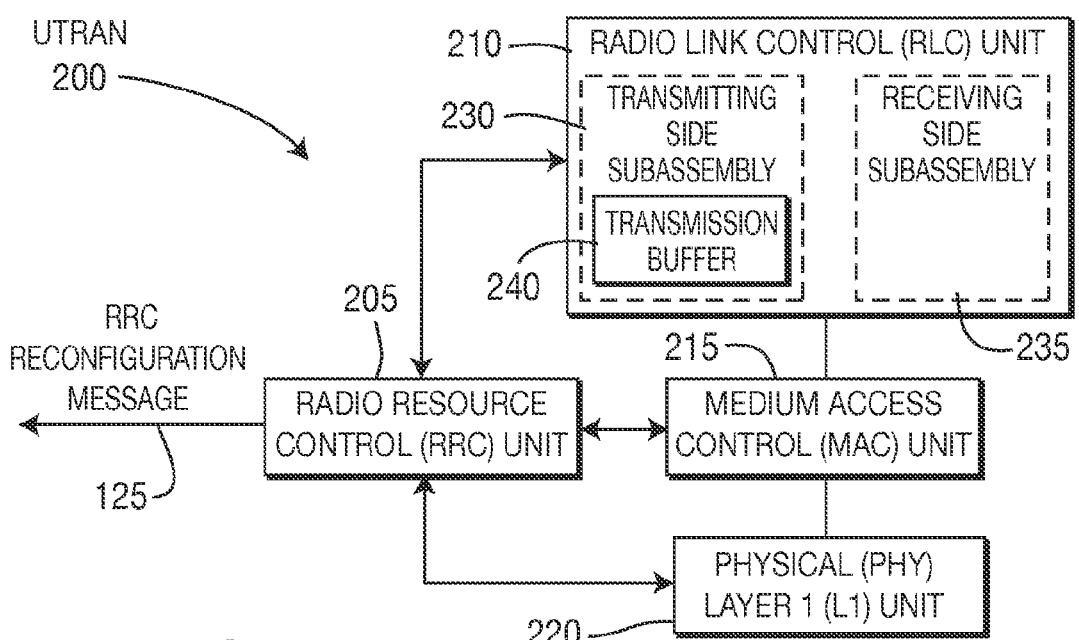
FIG. 2 is an exemplary block diagram of a UTRAN that sends an RRC reconfiguration message to the WTRU of FIG. 1.

The RRC reconfiguration message 125 may be generated by a UTRAN. FIG. 2 is a block diagram that depicts an example of a configuration of a protocol stack in UTRAN 200. The UTRAN 200 may include an RRC unit 205, an RLC unit 210, a MAC unit 115 and PHY L1 unit 220. The RLC unit 210 includes a transmitting side subassembly 230 and a receiving side subassembly 235. The transmitting side subassembly 230 includes a transmission buffer 240. The RRC unit 205 generates the RRC reconfiguration message 125 to initiate a serving cell change.

The UTRAN 200 may also include a target Node-B, a source Node-B, a controlling RNC (CRNC) and a serving RNC (SRNC) (not shown). The RNC may include an RLC unit and an RRC unit (not shown). Alternatively, the RNC functionalities are included in the Node-B and thus no controlling RNC or serving RNC is present.

RLC instances are not required to have the same RLC configuration for all RBs mapped to an HS-DSCH. For example, a WTRU connected to an enhanced cell may simultaneously support one or more RLC instances configured with fixed size RLC PDUs and/or flexible size RLC PDUs. The enhanced MAC-ehs is capable of supporting reception of both fixed size RLC PDUs and flexible size RLC PDUs.

However, a WTRU operating in a non-enhanced cell cannot support RLC instances with flexible size RLC PDUs. All RLC entities mapped to a normal HS-DSCH, (i.e., a MAC-hs), have to be configured with fixed size RLC PDU operation. This is due to the fact that the normal MAC-hs configuration does not support the reception and signaling of flexible size RLC PDUs. Accordingly, an RLC supporting fixed size RLC PDUs may refer to an AM RLC instance or an unacknowledged mode (UM) RLC instance.

To avoid re-establishments, the logical channels corresponding to an RLC instance do not have to change their configuration when moving from a non-enhanced cell to an enhanced cell. For example, when a WTRU moves from a cell with a normal MAC-hs configuration to a cell with an enhanced MAC-ehs configuration, the RLC instances configured for supporting fixed size RLC PDUs do not have to be reconfigured to support flexible size RLC PDUs.

The RB supporting fixed size RLC PDUs in an enhanced cell may maintain the fixed size RLC PDU configuration, or may be reconfigured to support flexible size RLC PDUs at the time of the handover or at a later time, in which case an RB reconfiguration procedure will be triggered and the RRC will perform the required steps. This allows signaling RBs to maintain their existing RLC configuration and avoid re-establishment of the RLC entity. If handovers between non-enhanced and enhanced cells occur often within a network, this method avoids re-establishment of the non-enhanced RLC AM instances if the WTRU moves frequently between non-enhanced and enhanced cells. This method also allows optimizations for UM RLC instances. If UM RLC instances are not extended to support flexible size RLC PDUs in R7, the UM RLC instances do not have to be re-established or reconfigured when moving from non-enhanced cells to enhanced cells, and vice versa. If flexible size PDUs are introduced for UM RLC instances, then the same methods as described for AM RLC apply.

RLC Behavior Re-Establishment Per RB when Moving Between Enhanced Cells and Non-Enhanced Cells When the WTRU changes serving cells during handover which support different releases, (i.e., R6 and R7), the WTRU has the option of maintaining an existing RLC instance without changing its configuration, (i.e., supporting fixed size RLC PDUs over an enhanced MAC configuration), or the existing RLC instance may be reconfigured. However, an RLC instance supporting flexible size RLC PDUs in an enhanced L2 cell cannot maintain its configuration when moving to a non-enhanced L2 cell because the normal MAC-hs cannot support reception of flexible size RLC PDUs. Therefore, an RLC re-establishment is required or a new procedure handling the change of RLC configuration is necessary to minimize data loss. The change of reconfiguration of the RLC unit may also occur due to a SRNS relocation, which involves moving from a SRNC that supports flexible size RLC PDU to a SRNC that does not support flexible size RLC PDUs.

Methods to perform and evaluate the need of RLC re-establishment are required on a per RB basis. When a WTRU moves between enhanced and non-enhanced L2 cells, or when the RLC changes configuration, no RLC reconfiguration occurs and thus no RLC re-establishment is performed, and/or a change of RLC configuration from fixed size RLC PDUs to flexible size RLC PDUs occurs. In this case, a RLC reconfiguration procedure may be triggered. A re-establishment of the RLC entity in this case is not always required, but may optionally be performed.

The reconfiguration procedure only configures the RLC entity to start supporting flexible size RLC PDUs. No loss of data occurs, since the fixed size RLC PDUs can be transmitted and be transparent to the WTRU and the MAC-ehs. The reconfiguration procedure only configures the RLC entity to start supporting flexible size RLC PDUs. No loss of data occurs as the fixed size RLC PDUs may be transmitted to the WTRU and the MAC-ehs. When a change of RLC configuration from flexible size RLC PDUs to fixed size RLC PDUs occurs, an RLC re-establishment is required or, optionally, a new procedure that deals with the change and attempts to minimize data loss may be performed. The WTRU is configured to always remain in R7 RLC and support flexible size RLC PDUs. The UTRAN may change RLC configurations without explicitly indicating to the WTRU a change from R6 to R7, or vice versa, had occurred.

Evaluation Criteria for Performing an RLC Reconfiguration or Re-Establishment

When the RLC changes its configuration, an RB reconfiguration procedure will be triggered. RRC RB reconfiguration procedures and information elements are used to evaluate and indicate the need of a RLC re-establishment.

The need of a RLC re-establishment for the signaled RB may be determined by the RRC explicit signaling that adds a new field in an existing RB or a signaling RB (SRB) information element (IE) that indicates RLC re-establishment. The RRC explicit signaling may indicate a one sided or full re-establishment. RRC procedures corresponding to the RB reconfiguration procedure may be modified to perform condition checks on the new configuration parameters provided (i.e. size of RLC PDU, flexible or fixed) and the old configuration parameters of the reconfigured RLC entity (i.e. size of RLC PDU, flexible or fixed) and to evaluate the need for a RLC re-establishment.

The evaluation of re-establishment criteria may be performed in the description of generic actions on receipt of the RB mapping info IE, in the description of generic actions on receipt of the "RLC info" IE, and/or by adding a new section that describes generic actions on receipt of the downlink (DL) or uplink (UL) RLC configuration IE.

The following sections describe the different possibilities of evaluating and performing RLC re-establishment criteria, and is applicable to both RLC DL, RLC UL and optionally to UM entities.

Option 1

For this option, the RLC re-establishment evaluation is performed within the actions of the "RB mapping info" IE or in a new section that deals with actions upon receipt of the "RLC configuration" IE. Note that the RLC configuration (i.e. whether RLC choice is fixed or flexible) is provided in the "RB mapping info" IE for this option. However, the "RLC configuration" IE may be provided in other information elements. The "RLC configuration" IE may provide the WTRU with information regarding whether the RLC instance is configured to support fixed size RLC PDUs or flexible size RLC PDUs.

If the "RLC configuration" IE is set to the value "enhanced" and the previously stored value was set to "normal," (or if the value is different from the one currently set), an RLC entity (or layer) is reconfigured according to the DL RLC configuration IE. Optionally, if re-establishment is required, the RLC entity is re-established. Otherwise, if the "RLC configuration" IE is set to the value "normal" and the previously stored value was set to "enhanced" (or if the value is different from the one currently set). The RLC entity is re-established by performing one sided or full re-establishment.

Upon the reception of a RRC message that results in the reconfiguration of the RB, the WTRU performs a set of actions related to RB mapping. For the UL RLC operation, the condition for re-establishment may optionally be performed here. More specifically, if that RB is using AM and the RLC PDU configuration (i.e. choice of RLC PDU size) applicable to the UL logical channel is changed from a configuration that supports flexible size RLC PDUs to fixed size RLC PDUs, and if the IE "one sided RLC re-establishment" is included in that RRC message and it is set to TRUE, then the WTRU re-establishes the transmitting side of the corresponding RLC entity. Otherwise, the WTRU re-establishes the corresponding RLC entity.

When the a configuration that supports fixed size RLC PDUs is changed to a configuration that supports flexible size RLC PDUs, the RLC re-establishment is optional and may be performed when the length indicator indicated in a length indicator field of the RLC PDUs changes between 7 and 15 bits. As described above, either only the transmitting side subassembly 130 and 230, (if the IE "one sided RLC re-establishment" is included), or the entire RLC unit 110 and 210, (i.e., both the transmitting side subassembly 130 and 230, and the receiving side subassembly 135 and 235), may be re-established.

Option 2

The RLC re-establishment criteria is evaluated in the actions upon receipt of the "RLC info" IE. When the actions corresponding to the "RLC info" IE are performed, the procedure needs to be aware of the configuration of the RLC entity, (i.e., flexible size RLC PDU or fixed size RLC PDU). This may be performed by adding a new IE in the "RLC info" IE indicating the RLC configuration. The new IE indicates whether flexible or fixed RLC PDU size may be used. The new IE also indicates whether enhanced or a normal RLC is used.

The DL RLC PDU size IE set of values may be extended to contain a reserved value that implicitly indicates that the RLC supports flexible size RLC PDUs. For example, value 0 or 8 may be used, or "all 1" in binary, and the like. The "RB mapping info" IE and the "DL RLC configuration" IE that specifies the version of the RLC configuration used are examined. Information of the RLC configuration is obtained from any other IE that contains this information. If the new IE is not included in the "RLC info" IE, the re-establishment procedure is then based on information from other elements or the re-establishment procedure occurs in the RB mapping info IE.

If a new RB supports, (i.e., is configured to start operating with), fixed size RLC PDUs and an old RB supports, (i.e., was configured to operate with flexible size RLC PDUs), then the RLC entity is re-established. The re-establishment may be a one sided re-establishment. For example, for the DL RLC, only the receiving side may be re-established and, for the UL RLC, only the transmitting side may be re-established. To perform a one-sided re-establishment, the existing IE "one sided re-establishment" in the "RLC info" IE may be used. Optionally, the RRC procedure specifically indicates to re-establish the receiving entity or transmitting entity without using the IE "one sided re-establishment".

If a new RB supports flexible size RLC PDUs and an old RB supports fixed size RLC PDUs, and the RLC unit 110 and 210 is reconfigured, then re-establishment may be optional.

A description of the RRC procedure is described below. The RRC procedure has been modified corresponding to the "RLC info" IE. For the purposes of this description, a new information element "DLRLC size indicator" is added to the "RLC info" IE or the UL, "UL RLC size indicator", which has a value of fixed or normal RLC. An example of the new IE is shown in Table 1.

The RRC procedure corresponding to the actions performed when the "RLC info" IE is present is modified to account for changes in the RLC instance configuration. The "RLC size indicator" IE is used as an example in the procedure described below. However, in general, the "RLC size indicator" IE represents an indication of the RLC configuration and may be called differently and have a different enumeration such as enhanced/normal or values.

The modified RRC procedure may be performed as follows:

Upon reception of the IE "RLC info", the WTRU shall:

---

1> if the IE "Downlink RLC mode" is present and is set to "AM RLC":
  2> if the IE "DL RLC size indicator" is present and set to the value "fixed";
    3> if the value is different from the one currently set in the RLC entity:
      4> if the IE "one sided RLC re-establishment" is set to TRUE:
        5> re-establish the receiving side of the corresponding RLC entity.
      4> else:
        5> re-establish the corresponding RLC entity.
    3> configure the corresponding RLC entity according to the new RLC PDU size indicator;
  2>else, if the "DL RLC size indicator" is present and set to "flexible";
    3> if the value is different from the one currently set in the RLC;
      4> reconfigure the RLC entity (optionally, re-establish RLC if the RRC is configured to re-establish when moving from a non-enhanced cell to an enhanced cell).
2> else; (following the else statement are the procedures that deal with the fixed RLC PDU size instances or with the case where the DL RLC size indicator is not present. The steps following this else statement correspond to steps in R6);
  3> if IE "DL RLC PDU size" is not present;
    4> determining the downlink RLC PDU size will be handled at RLC level, without any configuration from RRC.
    NOTE: The case where this mandatory IE is not present is meant to handle the interaction with a network using an earlier release of the specification.
  3> else, if the IE "DL RLC PDU size" is present and no downlink RLC PDU size is currently set in the RLC entity:
    4> configure the corresponding RLC entity with the downlink RLC PDU size.
  3> else, if the IE "DL RLC PDU size" is present and its value is different from the one currently set in the RLC entity:
NOTE: The downlink RLC PDU size set in the RLC entity can either be explicitly configured or, in case no explicit configuration is provided, derived by the first received RLC PDU.
    4> if the IE "one sided RLC re-establishment" is set to TRUE:
      5> re-establish the receiving side of the corresponding RLC entity.
    4> else:
      5> re-establish the corresponding RLC entity.
    4> configure the corresponding RLC entity with the new downlink RLC PDU size.

---

The condition check for RLC re-establishment is not restricted to the order specified in the above two options, and thus may be performed in any order. In addition, the name of the new IEs, such as DL RLC configuration IE and DL RLC size indicator IE, are subject to changes. The procedure corresponding to this IE remains the same regardless of the IE names.

For Option 2, an example of the "RLC info" IE functional definition is provided in Table 1 below.

TABLE 1

Modified "RLC info" IE

| Information Element/Group name | Need | Multi | Type and reference | Semantics description | Version |
|---|---|---|---|---|---|
| CHOICE Uplink RLC mode | OP | | | Indicates if Acknowledged, Unacknowledged or Transparent mode RLC shall be used. | |
| >AM RLC | | | | | |
| >>Transmission RLC discard | MP | | Transmission RLC discard 10.3.4.25 | | |
| >>Transmission window size | MP | | Integer(1, 8, 16, 32, 64, 128, 256, 512, 768, 1024, 1536, 2047, 2560, 3072, 3584, 4095) | Maximum number of RLC PDUs sent without getting them acknowledged. This parameter is needed if acknowledged mode is used. WTRU shall also assume that the UTRAN receiver window is equal to this value. | |

TABLE 1-continued

Modified "RLC info" IE

| Information Element/Group name | Need | Multi | Type and reference | Semantics description | Version |
| --- | --- | --- | --- | --- | --- |
| >>Timer_RST | MP | | Integer(50, 100, 150, 200, 250, 300, 350, 400, 450, 500, 550, 600, 700, 800, 900, 1000) | Elapsed time in milliseconds. It is used to trigger the retransmission of RESET PDU. | |
| >>Max_RST | MP | | Integer(1, 4, 6, 8, 12 16, 24, 32) | | |
| >>Polling info | OP | | Polling info 10.3.4.4 | | |
| >UM RLC | | | | | |
| >>Transmission RLC discard | OP | | Transmission RLC discard 10.3.4.25 | | |
| >TM RLC | | | | | |
| >>Transmission RLC discard | OP | | Transmission RLC discard 10.3.4.25 | | |
| >>Segmentation indication | MP | | Boolean | TRUE indicates that segmentation is performed. | |
| CHOICE Downlink RLC mode | OP | | | Indicates if Acknowledged, Unacknowledged or Transparent mode RLC shall be used | |
| >AM RLC | | | | | |
| >>DL RLC PDU size indicator | MP | | Enumerated(fixed, flexible) | Indicates if flexible of fixed RLC PDU sizes shall be used | REL-7 |
| >>DL RLC PDU size | MP | | Integer(16 . . . 5000 by step of 8) | Unit is bits | REL-5 |
| >>In-sequence delivery | MP | | Boolean | TRUE indicates that RLC shall preserve the order of higher layer PDUs when these are delivered. FALSE indicates that receiving RLC entity could allow SDUs to be delivered to the higher layer in different order than submitted to RLC sublayer at the transmitting side. | |
| >>Receiving window size | MP | | Integer(1, 8, 16, 32, 64, 128, 256, 512, 768, 1024, 1536, 2047, 2560, 3072, 3584, 4095) | Maximum number of RLC PDUs allowed to be received. This parameter is needed if acknowledged mode is used. WTRU shall also assume that the UTRAN transmitter window is equal to this value | |
| >>Downlink RLC status Info | MP | | Downlink RLC status info 10.3.4.1 | | |

TABLE 1-continued

Modified "RLC info" IE

| Information Element/Group name | Need | Multi | Type and reference | Semantics description | Version |
|---|---|---|---|---|---|
| >UM RLC | | | | | |
| >>DL UM RLC LI size | MP | | Integer(7, 15) | Size in bits to use for the downlink RLC UM LI. | REL-5 |
| >>DL Reception Window Size | CV-Not-SIB16o | | Integer(32, 48, 64, 80, 96, 112) | | REL-6 |
| >TM RLC | | | | | |
| >>Segmentation indication | MP | | Boolean | TRUE indicates that segmentation is performed. | |
| One sided RLC re-establishment | MP | | Boolean | TRUE indicates that only one side of the AM RLC entity is re-established. | REL-5 |
| Alternative E-bit interpretation | CV-Not-SIB16o | | Enumerated (true) | The absence of this IE implies: "normal E-bit interpretation". | REL-6 |

If the RLC re-establishment for different RLC configurations is not evaluated in the "RLC info" IE, then the condition checks for DL RLC PDU size within the "RLC info" IE should only be performed if the AM RLC instance supports fixed RLC PDU sizes. Otherwise, if the condition check is performed and the DL RLC PDU size is present for flexible RLC configurations, unnecessary re-establishments may result.

Referring to FIGS. 1 and 2, an alternative method for adjusting the new RLC configuration in the WTRU 100 and the UTRAN 200 will now be disclosed. This alternative method is applicable when the receiving side subassembly 135 and 235 explicitly signals the RLC configuration via the RB RRC reconfiguration messages and is configured to support flexible size RLC PDUs. When the receiving side subassembly 135 and 235 is configured to support flexible size RLC PDUs, the receiving side subassembly 135 and 235 may receive an indication of the RLC PDU size that the transmitting side subassembly 130 and 230 is using, (when configured for supporting fixed size RLC PDUs), from the higher layers. This method is also applicable to the case where the RLC unit 110 and 220 changes the size of the length indicator field of the RLC PDUs between 7 and 15.

When changing from an RLC configuration that supports flexible size RLC PDU to an RLC configuration that supports fixed RLC PDU sizes, the transmitting side subassembly 130 and 230, and the receiving side subassembly 135 and 235 have to discard flexible size RLC PDUs. More specifically, at a given activation time, the transmitting side subassembly 130 and 230 discards flexible size RLC PDUs, (or RLC PDUs with a size other than the fixed acknowledged mode data (AMD) PDU size), that have been transmitted once and have not been acknowledged yet. An example activation time may be the time when the Node-B starts using the normal MAC-hs in the DL case, or the MAC-i/is in the UL case. The transmitting side subassembly 130 and 230 may discard the RLC PDUs according to one or a combination of any of the following rules.

1) Any RLC PDU with a size different than the length of the fixed RLC PDU, (applies to flexible size RLC PDUs that have been created but have not necessarily been transmitted yet);

2) Any RLC PDU with a size different than the length of fixed RLC PDUs that have already been transmitted at least once, (only applies to the RLC PDUs that have been transmitted or submitted to lower layers, whereby the RLC PDUs that have been created but have not yet been transmitted are not discarded);

3) All RLC PDUs with a sequence number (SN) up to and including the last RLC PDUs with a flexible RLC PDU size (or a size different than the length of the fixed PDU);

4) All RLC PDUs with an SN up to and including the last RLC PDU with a flexible RLC PDU size (or a size different than the length of the fixed PDU) that was transmitted at least once;

5) All RLC SDUs up to the last SDU contained within the last RLC PDU with a flexible PDU size (or a size different than the configured fixed PDU length);

6) All RLC SDUs up to the last SDU contained within the last RLC PDU with a flexible PDU size (or a size different than the configured fixed PDU length);

7) All RLC SDUs for which at least one segment was contained in a PDU of a size different than the configured fixed PDU size that was transmitted at least once; and/or 8) All RLC PDUs in a retransmission buffer that have been transmitted to lower layers and that have an SN assigned.

If the last RLC PDU discarded contains a segment of an RLC SDU, that RLC SDU may be optionally reconstructed using the new configuration, (i.e., a new fixed RLC PDU size).

The transmitting side subassembly 130 and 230 does not reinitialize state parameters and sequence numbers. Then, the transmitting side subassembly 130 and 240 proceeds to indicate to the receiving side subassembly 135 and 235 the RLC PDUs or RLC SDUs that have been discarded.

A move receive window (MRW) control super field (SUFI) may be used to indicate the discarded RLC PDUs or RLC SDUs. If "Send MRW" is not configured, the MRW SUFI is assembled with the discard information. More specifically, it should indicate the last SN of the discarded RLC PDU or RLC SDU, (SN_MRW=last discarded RLC PDU SN+1)). The receiving side subassembly 135 and 235 then discards all RLC PDUs with SN<SN_MRW and moves the receive window accordingly.

If "Send MRW" is not configured, then the information of only 15 discarded SDUs can be indicated. This may not be enough to indicate all the RLC SDUs to be discarded, especially if a large number of SDUs are discarded. Therefore, more than one MRW SUFI may have to be sent.

An N length field can always be set to zero, or it may optionally be set to indicate the length of the last SDU pertaining to the PDU.

A new MRW SUFI is now introduced that is only used for handover purposes. The new MRW SUFI may include an SN_MRW field to indicate the sequence number of the last PDU or SDU to be discarded. The receive window is updated accordingly and all RLC PDUs with SN up to and including the SN_MRW field are discarded. Optionally, prior to discarding all RLC PDUs, the receiving side subassembly 135 and 235 can assemble all RLC PDUs into RLC SDUs and deliver them to higher layers. The receiving side subassembly 135 and 235 can then discard all RLC PDUs up to and including SN_MRW that cannot be reassembled into RLC SDUs.

RLC re-establishment can be avoided by using the SDU discard function to discard SDUs that have been created with flexible size RLC PDUs when the serving cell changes to a legacy Node-B, or when a legacy Node-B is added to the enhanced dedicated channel (E-DCH) active set for the UL case. The RLC then uses the MRW SUFI to indicate to the WTRU to move the receive window and discard the same RLC PDUs.

This method results in the same amount of data loss as RLC re-establishment if the reconfiguration takes place at the activation time. However, data loss can be minimized if the transmitting side subassembly 130 and 230 start generating fixed RLC PDUs when the handover decision is made or when the transmitting side subassembly 130 and 230 is made aware of the handover. At the time the handover takes place, (i.e., at the given activation time), the discard function is initiated. This will allow the RLC unit 110 to try to flush out some RLC PDUs with flexible size until the activation time expires. At the time data is transmitted over the target cell radio link, (i.e., a handover is performed), all non-acknowledged flexible size RLC PDUs in the retransmission buffer 140 and 240 must be discarded using the SDU discard function, since they are not supported by the target Node-B.

This may pose a disadvantage because the transmitting side subassembly 130 and 230 may only update its transmit parameters and state variables after a MRW_ACK is received from the WTRU, which may temporarily stall the transmit window. However, an advantage to this method is that data loss can be minimized.

The initiation of the procedure can be indicated by one or a combination of the following options:

1) The procedure may be indicated through explicit signaling from higher layers (i.e., initiate SDU discard for handover purposes).
2) The procedure may be internally triggered by the RLC when a change from flexible to fixed RLC PDU size is detected (i.e., when a reconfiguration from flexible to fixed is indicated in the RRC messages).
3) The procedure initiated at a given activation time for handover purposes if a synchronized change is requested.

SDU Discard Function for Acknowledged, Unacknowledged, and Transparent Mode

Discard for RLC Reconfiguration Purposes

This alternative is only applicable for RLC acknowledge mode entities. It is triggered when the RLC configuration changes from flexible to fixed RLC PDU size. Optionally, this procedure can also be triggered if the RLC configuration changes from a fixed size RLC PDU configuration to a flexible size RLC PDU configuration, and/or the length indicator size changes.

If the RLC configuration changes from a flexible size RLC PDU configuration to a fixed size RLC PDU configuration, all SDUs that have segments or "length indicators" indicating the end of the SDUs in the AMD PDUs that have been transmitted to lower layers are discarded, (optionally, up to and including the last AMD PDU), with a size different than the new configured AMD PDU size, and explicit signaling is utilized to inform the receiving side subassembly 135 and 235.

Transmitter RLC Behavior to Minimize Data Loss

Optionally, the behavior of the transmitting side subassembly 130 and 230 may be modified in order to minimize data loss when switching from flexible PDU sizes to fixed PDU sizes. When the transmitting side subassembly 130 and 230 is made aware of the switch to fixed PDU sizes, the transmitting side subassembly 130 and 230 should start generating fixed size RLC PDUs prior to the activation time specified by higher layers (i.e., when the switch will take place). These fixed size RLC PDUs may include all PDUs already created that have not yet been transmitted, (i.e., they should be regenerated according to the fixed size), and all new PDUs created from newly arrived or buffered SDUs. Alternatively, the transmitting side subassembly 130 and 230 can continue generating RLC PDUs with a flexible size, but change the configured maximum RLC PDU size to match the fixed RLC PDU size that is going to be configured when the handover takes place.

At the activation time, if all PDUs in the transmitting side subassembly 130 and 230, (including PDUs in the retransmission buffer 140 and 240), are of a size equal to the configured fixed size RLC PDUs, the transmitting side subassembly 130 and 230 should continue normal operation with the fixed size RLC PDUs, without discarding any PDUs. Otherwise, the transmitting side subassembly 130 and 230 should only discard RLC PDUs that are not the same size as the configured fixed length, including those RLC PDUs that have already been transmitted.

When an RLC re-establishment procedure is performed, the procedure should be modified to take into account that not all PDUs are discarded at the activation time. When the transmitting side subassembly 130 and 230 indicates to the receiving side subassembly 135 and 235 to move its receive window (MRW indication), the PDU discard procedure described above may be used to indicate which PDUs have been discarded.

Optionally, the procedure could be modified such that the MRW indication is sent earlier and the receiving side subassembly 135 and 235 only adjust its receive window at the activation time. The time when the receiving side subassembly 135 and 235 must adjust its receiving window could be explicitly indicated in the MRW indication, or the receiving side subassembly 135 and 235 may adjust its receiving window at the activation time when the transport channel reconfiguration should take place.

The transmitting side subassembly 130 and 230 should be informed of the switch from flexible to fixed PDU size as soon as possible once the decision is made at higher layers, rather than waiting until the activation time. This allows more time prior to the activation time to successfully transmit the remaining flexible size PDUs and limits the number of flexible size PDUs that will be discarded at the activation time.

Method of Avoiding RLC Re-Establishment and Minimizing Data Loss

This method may be used alone or in a combination with one of the methods described above.

In order to minimize data loss, at the time of change from flexible size RLC PDUs to fixed size RLC PDUs, the transmitting side subassembly 130 and 230 does not discard any of the flexible RLC PDUs created and transmitted. However, since the normal MAC-hs or MAC-e/es will only support reception of RLC PDUs with fixed sizes corresponding to one of a size index identifier (SID) for the DL or a data descriptor identifier (DDI) for the UL configured for each priority queue or logical channel, the retransmitted RLC PDUs over the normal MAC-hs or MAC-e/es have to correspond to one of these pre-defined sizes.

Padding can be used to ensure that the RLC PDUs are of a valid size. At the time of the RLC configuration change, at the time the handover decision is made, or at the given activation time, the transmitting side subassembly 130 and 230 can use padding to change the size of all flexible RLC PDUs (i.e., with a size different than fixed) to be retransmitted, such that they match one or a combination of the following sizes:
1) A configured fixed RLC PDU size, if the flexible RLC PDU size is less than the fixed RLC PDU size.
2) The configured flexible maximum RLC PDU size prior to the reconfiguration. The RNC must ensure that the MAC-hs or MAC-e/es is also configured to maximum RLC PDU size.
3) The maximum RLC PDU size present in the retransmission buffer. The RNC must ensure that the MAC-hs or MAC-e/es is also configured to support the receptions of this size, (i.e., one of the SIDs must correspond to this maximum RLC PDU size).
4) For each flexible RLC PDU, match the size to next largest SID or DDI size configured for the MAC-hs queue to which the logical channel (MAC-d flow) corresponds too.

If the RLC PDU size is larger than any of the sizes to be matched as listed above, padding cannot be used. However, the WTRU may discard them using the SDU discard procedure as described above.

Alternatively, the RLC PDUs can be re-segmented to match the new fixed RLC PDU size, and if the last remaining segment is less than the fixed RLC PDU size (or less than the configured size to be matched), then padding can be used.

The change from flexible size to fixed size can be signaled to the receiving side subassembly 135 and 235, or optionally, it can be transparent to the receiving side subassembly 135 and 235, (i.e., the receiving side subassembly 135 and 235 always operates in flexible RLC).

When adding padding, the length indicator field(s) of the RLC PDU may have to be updated to reflect the changes and indicate where the padding begins.

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a wireless transmit/receive unit (WTRU), wherein the WTRU comprises a radio link control (RLC) entity having a receiving side subassembly and a transmitting side subassembly, the method comprising:
    receiving a radio resource control (RRC) message including a size indicator information element (IE), an RLC protocol data unit (PDU) length IE and a one-sided RLC re-establishment IE;
    reconfiguring the RLC entity to receive flexible size RLC PDUs in accordance with the RLC PDU length IE on condition that the size indicator IE indicates flexible size RLC PDUs and the RLC entity is configured to receive fixed size RLC PDUs; and
    re-establishing at least one of the receiving side subassembly and the transmitting side subassembly in accordance with the one-sided RLC re-establishment IE on condition that the size indicator IE indicates flexible size RLC PDUs, the RLC entity is configured to receive fixed size RLC PDUs and the RLC PDU length IE is different from an RLC PDU length configured in the RLC entity.

2. The method of claim 1, wherein only the receiving side subassembly is re-established if the one-sided RLC re-establishment IE is set to TRUE.

3. The method of claim 1, wherein the RRC message includes an RLC info IE, the method further comprising: evaluating RLC re-establishment criteria responsive to receiving the RLC info IE.

4. The method of claim 1, wherein the RRC message includes a Downlink RLC mode IE set to acknowledged mode.

5. The method of claim 1, wherein the RRC message signals to the WTRU that a RLC reconfiguration is occurring at a serving high speed downlink shared channel (HS-DSCH) cell.

6. The method of claim 1, wherein the RRC message is received in connection with a relocation of an RRC connection from one serving radio network controller (SRNC) to another SRNC.

7. The method of claim 1, wherein the RRC message is received in connection with a change in serving high speed downlink shared channel (HS-DSCH) cells.

8. The method of claim 1, wherein the RRC message is received in connection with a change to serving high speed downlink shared channel (HS-DSCH) cell that supports an enhanced high-speed medium access control (MAC-ehs) configuration.

9. The method of claim 1, wherein the RLC PDU length IE indicates a maximum length for flexible size RLC PDUs.

10. A wireless transmit/receive unit (WTRU) comprising circuitry, including a processor and a memory storing instructions executable by the processor, wherein:
the circuitry is configured to implement a radio link control (RLC) entity that includes a receiving side subassembly and a transmitting side subassembly, and that is configured to receive a radio resource control (RRC) message including a size indicator information element (IE), an RLC protocol data unit (PDU) length IE and a one-sided RLC re-establishment IE;
the circuitry is configured to re-configure the RLC entity to receive flexible size RLC PDUs in accordance with the RLC PDU length IE on condition that the size indicator IE indicates flexible size RLC PDUs and the RLC entity is configured to receive fixed size RLC PDUs; and
the circuitry is configured to re-establish at least one of the receiving side subassembly and the transmitting side subassembly in accordance with the one-sided RLC re-establishment IE on condition that the size indicator IE indicates flexible size RLC PDUs, the RLC entity is configured to receive fixed size RLC PDUs and the RLC PDU length IE is different from an RLC PDU length configured in the RLC entity.

11. The WTRU of claim 10, wherein only the receiving side subassembly is re-established if the one-sided RLC re-establishment IE is set to TRUE.

12. The WTRU of claim 10, wherein the RRC message includes an RLC info IE, and wherein the RLC entity is configured to evaluate RLC re-establishment criteria responsive to receiving the RLC info IE.

13. The WTRU of claim 10, wherein the RRC message includes a Downlink RLC mode IE set to acknowledged mode.

14. The WTRU of claim 10, wherein the RRC message signals to the WTRU that a RLC reconfiguration is occurring at a serving high speed downlink shared channel (HS-DSCH) cell.

15. The WTRU of claim 10, wherein the RRC message is received in connection with a relocation of an RRC connection from one serving radio network controller (SRNC) to another SRNC.

16. The WTRU of claim 10, wherein the RRC message is received in connection with a change in serving high speed downlink shared channel (HS-DSCH) cells.

17. The WTRU of claim 10, wherein the RRC message is received in connection with a change to serving high speed downlink shared channel (HS-DSCH) cell that supports an enhanced high-speed medium access control (MAC-ehs) configuration.

18. The WTRU of claim 10, wherein the RLC PDU length IE indicates a maximum length for flexible size RLC PDUs.

19. A method of configuring a radio link control (RLC) entity in a wireless transmit/receive unit (WTRU), wherein the WTRU comprises a radio link control (RLC) entity having a receiving side subassembly and a transmitting side subassembly, the method comprising:
receiving a radio resource control (RRC) reconfiguration message, the RRC reconfiguration message including a size indicator information element (IE) and an RLC protocol data unit (PDU) length IE, wherein the size indicator IE indicates whether the RLC entity should be reconfigured between receiving fixed size RLC PDUs and flexible size RLC PDUs; and
if the size indicator IE indicates that the RLC entity should be reconfigured from receiving fixed size PDUs to receiving flexible size PDUs, comparing the received RLC PDU length IE to a configured RLC PDU length, wherein if the received RLC PDU length IE and configured RLC PDU length are different, re-establishing at least the receiving side subassembly in accordance with the received RLC PDU length IE, else proceeding with the current configuration; and
if the size indicator IE indicates that the RLC entity should be reconfigured from receiving flexible size PDUs to receiving fixed size PDUs, re-establishing at least the receiving side subassembly in accordance with the received RLC PDU length IE.

20. The method of claim 19, further comprising: configuring the RLC entity to receive fixed size RLC PDUs after re-establishing at least the receiving side subassembly.

21. The method of claim 19, further comprising: configuring the RLC entity to receive flexible size RLC PDUs after re-establishing at least the receiving side subassembly.

22. The method of claim 19, wherein only the receiving side subassembly is re-established if the one-sided RLC re-establishment IE is set to TRUE.

23. The method of claim 19, wherein the RRC message includes an RLC info IE, the method further comprising: evaluating RLC re-establishment criteria responsive to receiving the RLC info IE.

24. The method of claim 19, wherein the RRC message includes a Downlink RLC mode IE set to acknowledged mode.

25. The method of claim 19, wherein the RRC message signals to the WTRU that an RLC reconfiguration is occurring at a serving high speed downlink shared channel (HS-DSCH) cell.

26. The method of claim 19, wherein the RRC message is received in connection with any of (i) a relocation of an RRC connection from one serving radio network controller (SRNC) to another SRNC, and (ii) a change in serving high speed downlink shared channel (HS-DSCH) cells.

27. The method of claim 19, wherein the RLC PDU length IE indicates either one of a plurality of lengths for fixed size RLC PDUs or a maximum length for flexible size RLC PDUs.

28. A wireless transmit/receive unit (WTRU) comprising circuitry, including a processor and a memory storing instructions executable by the processor, wherein:
the circuitry is configured to implement a radio link control (RLC) entity that includes a receiving side subassembly and a transmitting side subassembly, and that is configured to receive radio resource control (RRC) reconfiguration message, the RRC reconfiguration message including a size indicator information element (IE) and an RLC protocol data unit (PDU) length IE, the size indicator IE indicating whether the RLC entity should be reconfigured between receiving fixed size RLC PDUs and flexible size RLC PDUs; and the circuitry is configured to compare the received RLC PDU length IE to a configured RLC PDU length if the size indicator IE indicates that the RLC entity should be reconfigured from receiving fixed size PDUs to receiving flexible size PDUs, and if the received RLC PDU length IE and configured RLC PDU length are different, re-establish at least the receiving side subassembly in accordance with the received RLC PDU length IE, else proceed with the current configuration; and the circuitry is configured to re-establish at least the receiving side subassembly in accordance with the received RLC PDU length IE if the size indicator IE indicates that the RLC entity should be reconfigured from receiving flexible size PDUs to receiving fixed size PDUs.

29. The WTRU of claim 28, wherein the circuitry is configured to configure the RLC entity to receive fixed size RLC PDUs after re-establishing at least the receiving side subassembly.

30. The WTRU of claim 28, wherein the circuitry is configured to configure the RLC entity to receive flexible size RLC PDUs after re-establishing at least the receiving side subassembly.

31. The WTRU of claim 28, wherein only the receiving side subassembly is re-established if the one-sided RLC re-establishment IE is set to TRUE.

32. The WTRU of claim 28, wherein the RRC message includes an RLC info IE, and wherein the circuitry is configured to evaluate RLC re-establishment criteria responsive to receiving the RLC info IE.

33. The WTRU of claim 28, wherein the RRC message includes a Downlink RLC mode IE set to acknowledged mode.

34. The WTRU of claim 28, wherein the RRC message signals to the WTRU that an RLC reconfiguration is occurring at a serving high speed downlink shared channel (HS-DSCH) cell.

35. The WTRU of claim 28, wherein the RRC message is received in connection with any of (i) a relocation of an RRC connection from one serving radio network controller (SRNC) to another SRNC, and (ii) a change in serving high speed downlink shared channel (HS-DSCH) cells.

36. The WTRU of claim 28, wherein the RLC PDU length IE indicates either one of a plurality of lengths for fixed size RLC PDUs or a maximum length for flexible size RLC PDUs.

* * * * *